UNITED STATES PATENT OFFICE.

PETER SPENCE, OF NEWTON HEATH, GREAT BRITAIN.

IMPROVEMENT IN THE MANUFACTURE OF WHITE LEAD.

Specification forming part of Letters Patent No. 53,093, dated March 6, 1866.

*To all whom it may concern:*

Be it known that I, PETER SPENCE, of Newton Heath, in the county of Lancaster, Great Britain, manufacturing chemist, have invented Improvements in the Manufacture of White Lead; and I do hereby declare that the following is a full and exact description thereof.

My improvements consist in dissolving oxide or carbonate of lead by the use of caustic-alkaline solutions, and for this purpose I prefer caustic soda; but other caustic solutions will answer the purpose. I take the aforesaid oxide or carbonate of lead or substances containing them and reduce them to powder, and stir the said powder of oxide or carbonate of lead or substances containing oxide or carbonate of lead in the solution of caustic soda, and I find it is not needful that the said solution should be hot, and after stirring till the solution will dissolve no more I remove the solution and add more until I find that all the oxide or carbonate of lead in the said substances is dissolved.

I may state that any ore that can by calcination or otherwise be brought into the state of oxide or carbonate of lead, or to contain any considerable portion of oxide or carbonate of lead, although containing other substances, is fit for my purpose and ready to be operated upon by the caustic solution.

Galena or substances containing galena I calcine at a low heat, either in the ordinary reverberatory furnace or other suitable furnace. I heat the galena till the galena is completely calcined, but avoiding its reduction into metallic lead. I now find that the galena has been partly converted into oxide of lead and partly into sulphate of lead. Before stirring this into the caustic solution I subject it to the action of a solution of soda ash. This solution does not dissolve the oxide of lead, but it changes the sulphate of lead into carbonate of lead. The soda-ash solution being removed and washed out by water, the material containing the calcined galena is now fit for being stirred in the solution of caustic soda. Having now obtained from any of these ores or substances containing oxide or carbonate of lead by stirring, as aforesaid, a liquid holding oxide of lead in solution, I allow it to settle till perfectly clear and then remove the clear solution into a vessel or vessels, into which I can conveniently throw into it, by pipes pierced with numerous holes, a continuous stream of carbonic-acid gas. The said carbonic-acid gas combines both with the soda and the lead oxide, and as soon as the soda becomes carbonated it parts with the lead oxide, which is now precipitated as a pure white substance, partly oxide and partly carbonate of lead. As soon as by observation or trial it is seen that no more precipitate is forming the supply of carbonic-acid gas is stopped and the white lead is allowed to settle. The solution has now become carbonate of soda and is removed, and after being subjected to the action of caustic lime, as is well known, and so converted into caustic-soda solution, it is ready again for acting on the substances, as aforesaid, containing oxide or carbonate of lead.

For the precipitation of the said oxide of lead I may say that the carbonic-acid gas I use may be obtained either from the action of hydrochloric acid on limestone or other carbonate of lime, or may be procured by the combustion of coke or charcoal, or in any other convenient manner, it being needful, however, that no sulphureted hydrogen should be in the carbonic acid used.

Carbonate of ammonia or bicarbonate of soda or bicarbonate of potash or other soluble carbonates or bicarbonates might be used for precipitating the white lead; but I prefer carbonic-acid gas as more economical.

The soda-ash solution used with calcined galena will have to be replaced after a time, as it becomes converted into sulphate of soda. The caustic-soda solution can be used over and over again, only requiring to be causticised with quicklime after precipitation and before being again used for dissolving the oxide of lead.

The precipitated white lead requires to be well washed with pure water and dried before being fit for sale.

I claim as my invention—

The production of white lead by dissolving substances containing oxide or carbonate of lead in caustic-alkaline solutions, and then precipitating the required carbonate.

PETER SPENCE.

Witnesses:
WM. TUDOR MABLEY,
W. T. CHEETHAM,
*Both of 14 St. Ann's Square, Manchester.*